April 28, 1925.
E. LATSHAW
CAR TRUCK
1,535,230
Original Filed Nov. 15, 1923    3 Sheets-Sheet 1
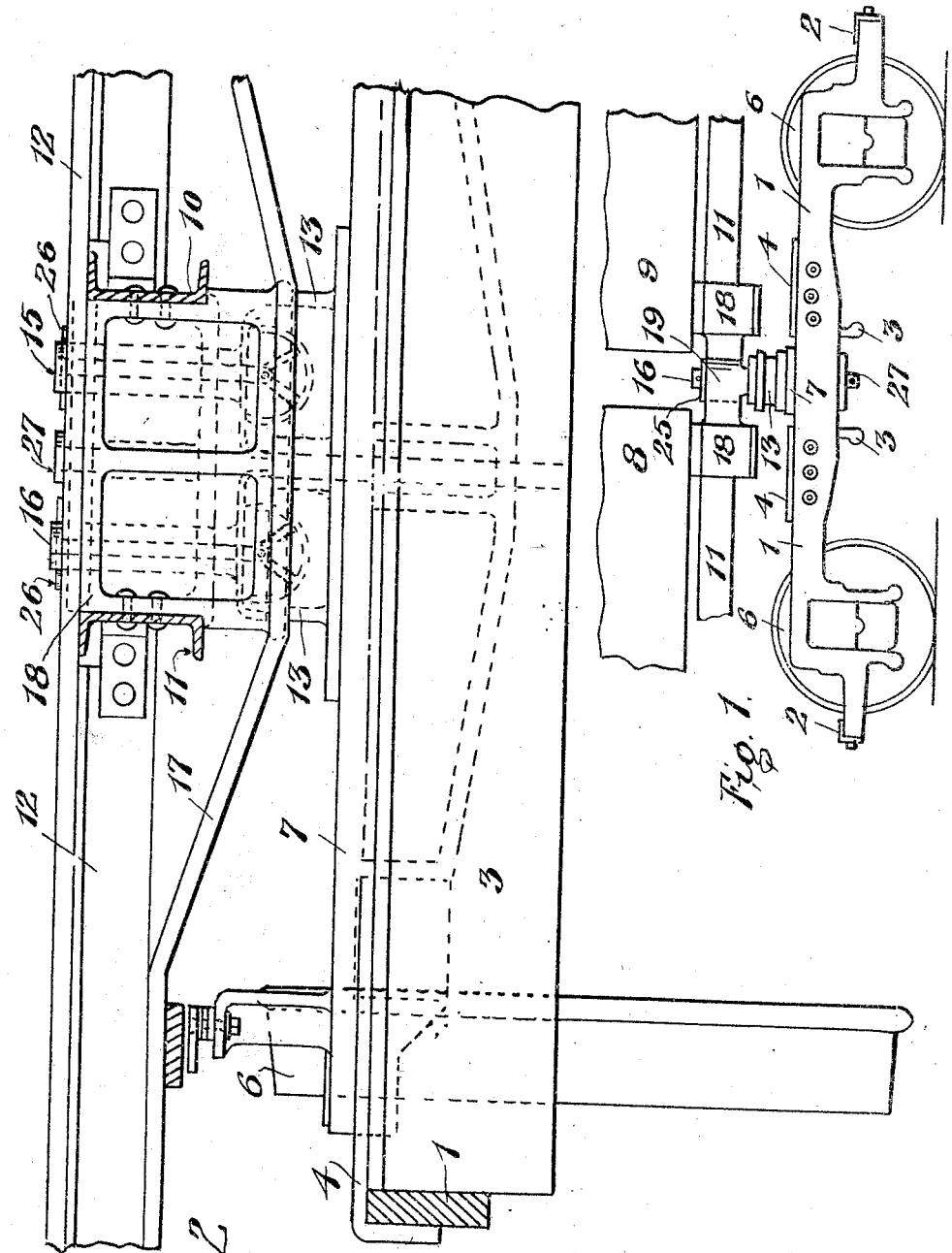
Inventor
Elmer Latshaw
By his Attorney

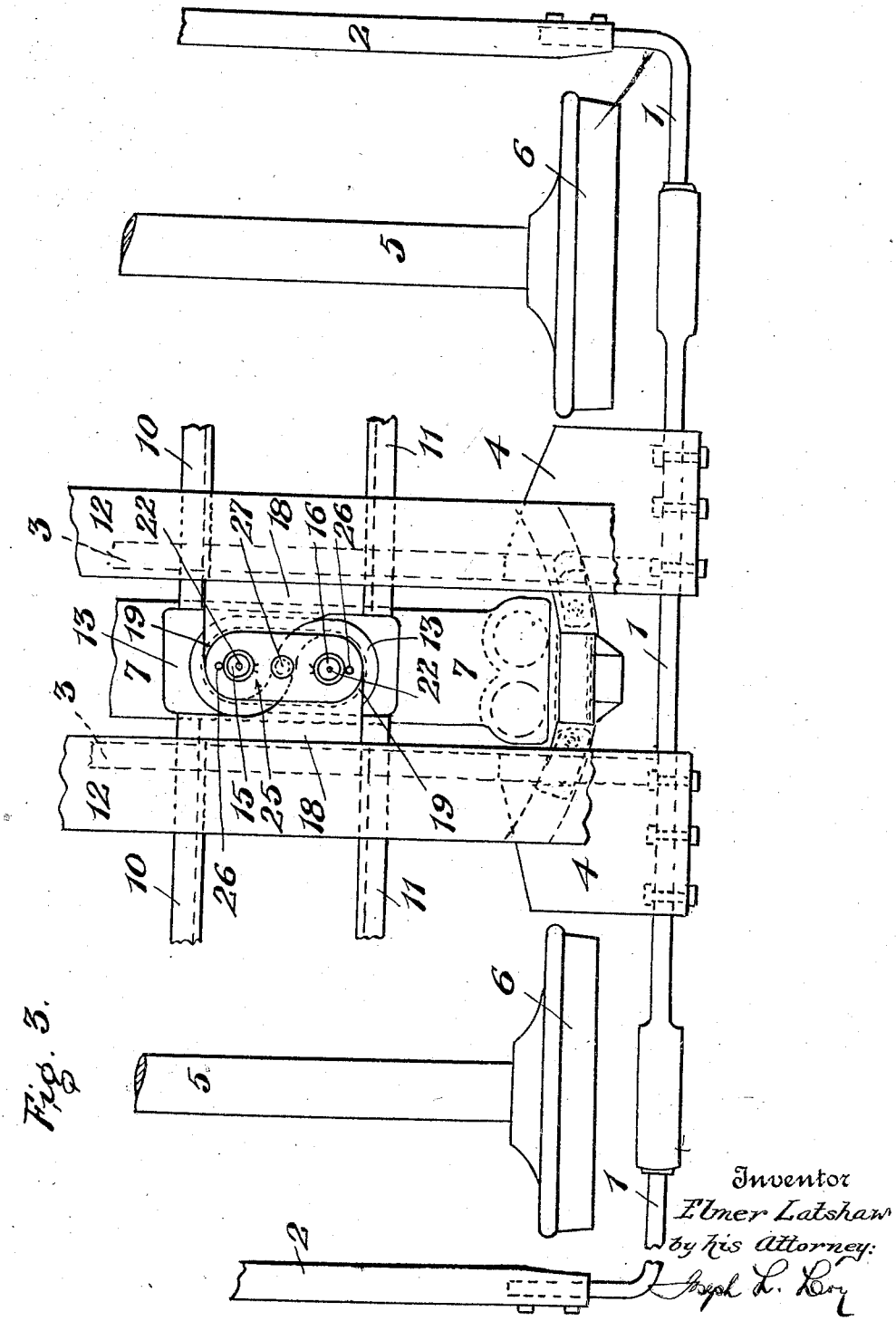

April 28, 1925. 1,535,230
E. LATSHAW
CAR TRUCK
Original Filed Nov. 15, 1923 3 Sheets-Sheet 3
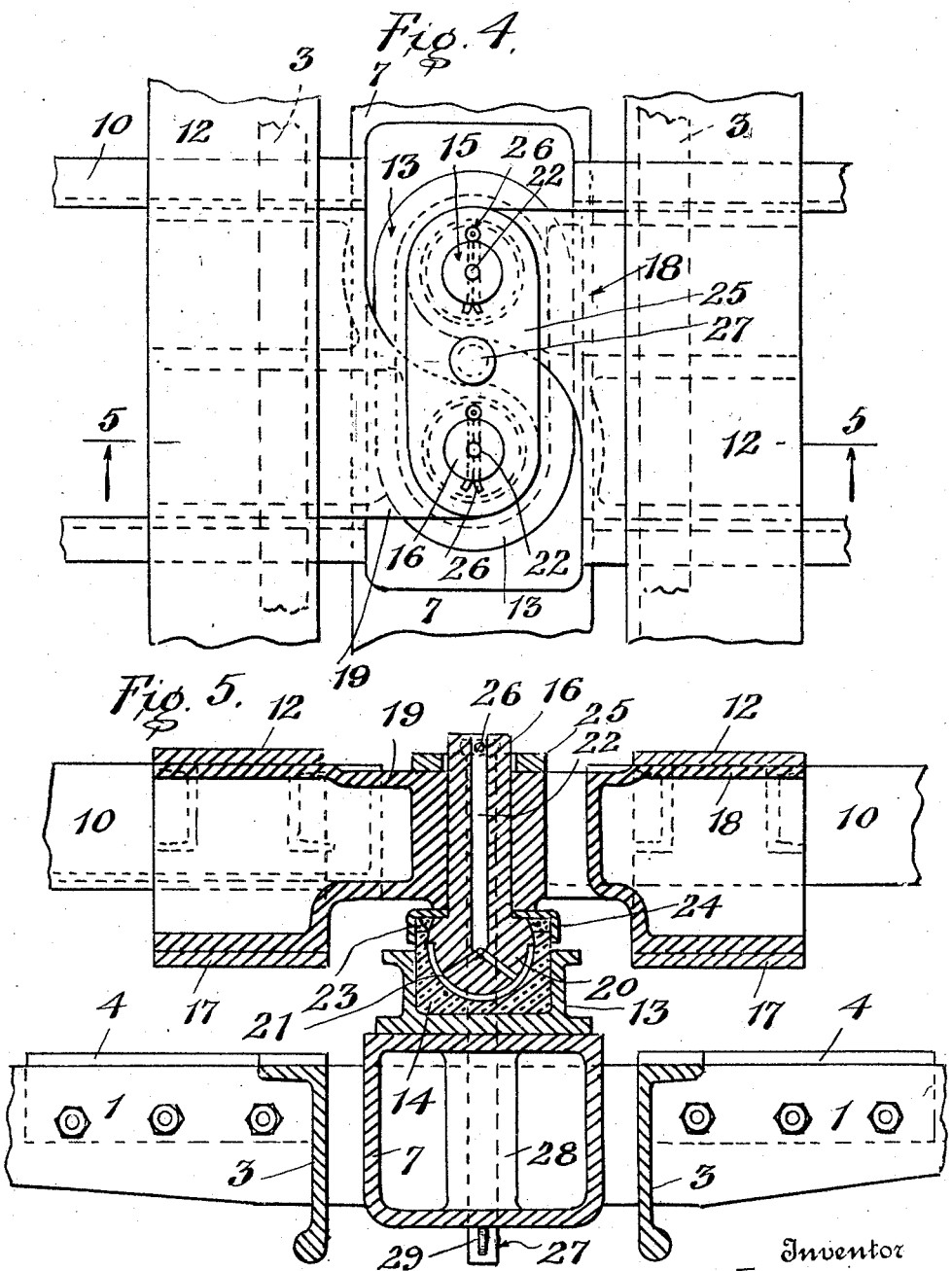

Patented Apr. 28, 1925.

1,535,230

UNITED STATES PATENT OFFICE.

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR TRUCK.

Original application filed November 15, 1923, Serial No. 674,856. Divided and this application filed January 9, 1925. Serial No. 1,391.

*To all whom it may concern:*

Be it known that I, ELMER LATSHAW, a citizen of the United States, and a resident of the city and county of Philadelphia, and State of Pennsylvania, have invented a new and useful Improvement in Car Trucks, of which the following is a specification.

This invention relates to a truck intended to support the ends of two car bodies, as is the practice in "articulated" cars; and has for its object to provide a truck and body mounting for the ends of the cars in which the ends of the cars are provided with pivotal points located on opposite sides of the center line of the truck, which pivots are independent of each other, whereby one car body can be readily removed from its connection to the truck without disturbing the connection of the other car body to the truck.

It has been the practice in the past to support both ends of the bodies on a single centrally located pivotal support on the truck. The disadvantage of this construction resides in the fact that it necessitates making the ends of the cars of different shape, and also that one car cannot be detached from the truck without disturbing the connection of the other to the truck. The improvements described herein enable the ends of the cars to be similar in design and one car can be readily detached from the truck without disturbing the connection of the other car thereto.

With these objects, and such other objects which may hereinafter appear, in view, I have devised the particular arrangement of parts set forth below, and more particularly pointed out in the claims appended hereto.

This application is a division of my copending application, Serial No. 674,856 filed November 15, 1923.

Reference is to be had to the accompanying drawing, forming a part hereof, in which Figure 1 is a side elevation of a truck made in accordance with my improvement showing its position relative to the ends of the car body, with various parts of the truck omitted for clearness.

Figure 2 is a transverse section of the car truck and parts of the car body frame.

Figure 3 is a plan view of a portion of the truck and parts of the car bodies including the pivotal connections of the bodies to the truck.

Figure 4 is a plan view of portions of the car body frame shown in Figure 3, and Figure 5 is a sectional view on the line 5—5 of Figure 4, looking in the direction of the arrows.

Throughout the various views of the drawings, similar reference characters designate similar parts.

In the preferred embodiment of my invention, 1 indicates one of the side frames of the truck, a similar side frame being located at the opposite side of the truck, and both of the side frames are connected by the end braces 2.

At 3 are shown transverse braces which unite the side frames, and at 4 are shown gusset plates which connect said braces 3 with the side frames and generally reinforce the truck frame.

At 5 are shown the axles, and at 6 are the wheels.

All of the foregoing parts are conventional elements of truck construction and to simplify the drawings I have omitted brake mechanisms and other conventional parts found upon car trucks. The truck bolster is shown at 7 and the same is suitably spring-suspended upon the truck in any desired well known manner. The ends of two cars are supported upon this bolster and are arranged to pivot thereon as will now be described.

At 10 and 11 is shown a pair of longitudinally disposed parallel frame members on the lower end or bottom of each of the car bodies and at 12 is shown a transverse frame member on the underside of the car body.

In Figure 1, the two car bodies which are supported by the truck are indicated at 8 and 9. At 13 is shown a bearing member which is secured on top of the truck bolster 7 and which is provided with a bearing block 14 which receives suitable pivot pins 15 and 16.

Located between the car body frame members 11 and 10 and secured to said frame members and also to the frame member 12 into a lower frame member 17 is a bracket 18 which is provided with an ear 19 through which the pivot bolt 15 passes. The lower end of the pivot bolt 15 terminates in a ball as at 20 and said ball-shaped end 20 is received in a recess 21 provided in the bearing block 14. The bolt 15 is provided with vertical and diagonal oil holes 22 which act as oil retainers for lubricating the ball and socket pivot joint. A suitable packing 23 held on the bearing block by a cover plate 24 acts to keep the dust and dirt from the ball and socket joint.

The pivot pin 16 is similar in all respects to the pin 15 and the said pin 16 extends through a similar bracket 18 on the opposite car body. The ears 19 on both brackets are located towards the opposite sides so that the pivot pins 15 and 16 are located on the transverse center line of the truck but are on opposite sides of the longitudinal center line of the truck.

At 25 is a plate which lies on top of the two brackets 18 and split pins 26 pass through the bolts 15 and 16 to hold the plate in position. The pin 27 passes through said plate 25 between the two brackets 18, through the bearing members 13 and 14 and though the bolster 7, said bolster having a boss 28 through which the pin 27 extends. A split pin 29 passes through the lower end of the pin 27 to hold the same in position. The bolt 27 holds the various parts together, that is, it holds down the brackets 18 on top of the bearing block 14 and also holds the half ball ends of the pivot pins in the recesses provided for them in the bearing block 14.

From the foregoing, it will be understood that since separate pivot pins are provided for the ends of each car body, one car can be readily removed from the truck by removing the center pin 27 and then removing the car from its pivot without disturbing the other car attached to the truck.

From the foregoing, it is obvious that my invention is not to be restricted to the exact embodiment shown, but is broad enough to cover all structures coming within the scope of the annexed claims.

What I claim is:

1. A mechanism of the class described comprising a car truck adapted to support the ends of two car bodies, said truck having separate pivotal connections for said bodies on opposite sides of its longitudinal center line.

2. A mechanism of the class described comprising a car truck adapted to support the ends of two car bodies, said truck having spaced separate pivotal connections for said car bodies on opposite sides of the longitudinal center line of the truck.

3. A mechanism of the class described comprising a car truck, a pair of car bodies having their ends supported on said truck, a pivotal connection between each of said car bodies and said truck, said pivotal connections being spaced from one another and located on opposite sides of the longitudinal center line of said truck.

4. A mechanism of the class described compising a car truck, a pair of car bodies having their ends supported on said truck, brackets on said car bodies, a pivot pin extending through each of said brackets and pivotally connecting the car bodies with the truck, said pivot pins being located at spaced positions from one another on opposite sides of the longitudinal center line of the truck.

5. A mechanism of the class described comprising a car truck, a pair of car bodies having their ends supported on said truck, brackets on said car bodies, and pivot pins for pivotally connecting said brackets with the car truck, said pivot pins being separated from one another and located on opposite sides of the longitudinal center line of said truck.

6. A mechanism of the class described comprising a car truck having a truck bolster, a pair of car bodies, brackets on said car bodies, each of said brackets extending over the truck bolster, said brackets being located on opposite sides of the longitudinal center line of the truck, and pivotal connections between said brackets and the truck bolster.

Signed at the city and county of Philadelphia, State of Pennsylvania, this 2nd day of January, 1925.

ELMER LATSHAW.